United States Patent
Chu et al.

(10) Patent No.: US 7,114,068 B2
(45) Date of Patent: *Sep. 26, 2006

(54) METHOD AND SYSTEM FOR RESTRICTING PXE SERVERS

(75) Inventors: Simon C. Chu, Chapel Hill, NC (US); Richard A. Dayan, Raleigh, NC (US); James L. Matlock, Cary, NC (US); David B. Rhoades, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/698,128

(22) Filed: Oct. 31, 2003

(65) Prior Publication Data
US 2005/0097310 A1    May 5, 2005

(51) Int. Cl.
*G06F 15/177* (2006.01)
*G06F 9/24* (2006.01)
*G06F 9/00* (2006.01)

(52) U.S. Cl. ............... 713/2; 713/1; 713/100
(58) Field of Classification Search ............ 713/1, 713/2, 100
See application file for complete search history.

(56) References Cited

U.S. PATENT DOCUMENTS 6,314,520 B1 * 11/2001 Schell et al. .............. 726/13
2004/0193867 A1 * 9/2004 Zimmer et al. ............. 713/2

* cited by examiner

*Primary Examiner*—Lynne H. Browne
*Assistant Examiner*—Stefan Stoynov
(74) *Attorney, Agent, or Firm*—Cynthia S. Byrd; Dillon & Yudell LLP

(57) ABSTRACT

A method and system for managing a secure network boot of a server blade. The server blade is part of a server blade chassis, which holds multiple server blades that communicate with outside devices via a Pre-boot eXecution Environment (PXE) enabled network interface card. When a server blade receives a response from a PXE boot server offering a boot program download, a Remote Supervisory Adapter (RSA) card, managed by a remote manager, compares the identity of the responding PXE boot server with a list of trusted PXE boot servers. Only if the responding PXE boot server is on the list of trusted PXE boot servers will the server blade be allowed to use a boot program provided by the responding PXE boot server.

8 Claims, 5 Drawing Sheets

METHOD AND SYSTEM FOR RESTRICTING PXE SERVERS

RELATED APPLICATIONS

The present invention is related to the subject matter of the following commonly assigned, U.S. patent application Ser. No. 10/674,776 entitled "Method and System for Restricting DHCP Servers" and filed Sep. 30, 2003. The content of the above-referenced application is incorporated herein by reference.

BACKGROUND OF THE INVENTION

1. Technical Field

The present invention relates in general to the field of computers, and in particular to multiple blade servers housed in a server chassis. Still more particularly, the present invention relates to a method and system for filtering, through a secure remote supervisor, responses from Pre-boot eXecution Environment (PXE) servers to a server blade's request for a boot program, such that responses to the request for the boot program are only utilized from trusted PXE servers.

2. Description of the Related Art

Server blade computers offer multiple server blades (computers mounted on separate boards) in a single chassis (blade chassis). Although each server blade may be under at least partial control of primary server blade in the chassis, each server blade typically functions as an independent server to specific clients. A typical arrangement of such as system is shown in FIG. 1, in which a blade chassis 102, having multiple server blades 103a–c, is connected to a network 106, which connects to multiple clients 104.

A PXE boot server network 108 is connected to blade chassis 102 and the individual server blades 103 via network 106. Each of the server blades 103 may utilize a network boot protocol known as Pre-boot eXecution Environment (PXE). PXE allows server blade 103 to request a network boot program from a boot server in the PXE boot server network 108. Such a boot server can provide a boot image that can be used to load a new operating system (OS), flash a Basic Input/Output System (BIOS) memory, or even erase data on a local hard disk.

To download a boot program, server blade 103 broadcasts a request to PXE boot server network 108. One or more of the PXE boot servers in PXE boot server network 108 respond back to server blade 103 offering a requested boot program. If responses from multiple boot servers from PXE boot server network 108 are put on network 106, then server blade 103 typically responds to the first request response to arrive a server blade 103.

A network boot of server blade 103 as described is not secure, since the broadcasted boot request can result in a responsive offer from any PXE server connected to network 106, including an unauthorized PXE server attempting to tamper with the network. Thus, an unauthorized PXE boot server could result in possible undesired operations such as exposures to operational security and/or destroying data on a local fixed disk drive. What is needed, therefore, is a method and system for preventing booting from unauthorized PXE servers.

SUMMARY OF THE INVENTION

The present invention is directed to a method and system for managing a secure network boot of a server blade. The server blade is part of a server blade chassis, which holds multiple server blades that communicate with outside devices via a Pre-boot eXecution Environment (PXE) enabled network interface card. When a server blade receives a response from a PXE boot server offering a boot program download, a Remote Supervisory Adapter (RSA) card, managed by a remote manager, compares the identity of the responding PXE boot server with a list of trusted PXE boot servers. Only if the responding PXE boot server is on the list of trusted PXE boot servers will the server blade be allowed to use a boot program provided by the responding PXE boot server.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2b depicts details of interface devices used by a server blade in the computer system of FIG. 2a;

DETAILED DESCRIPTION OF A PREFERRED EMBODIMENT

Figure 1:
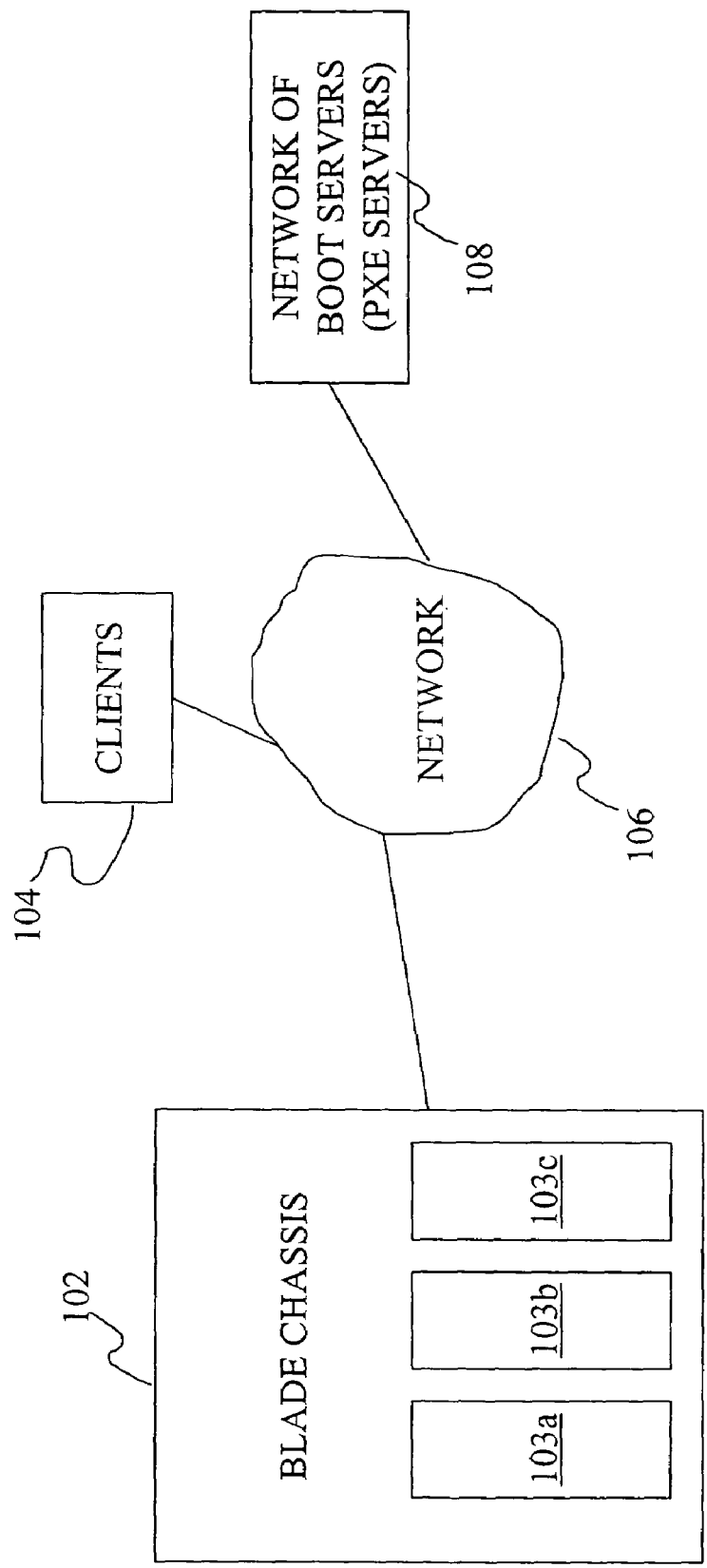
FIG. 1 depicts a prior art diagram of a network connecting a server blade computer (blade chassis) to a network of Dynamic Host Configuration Protocol (DHCP) servers.
Figure 2A:
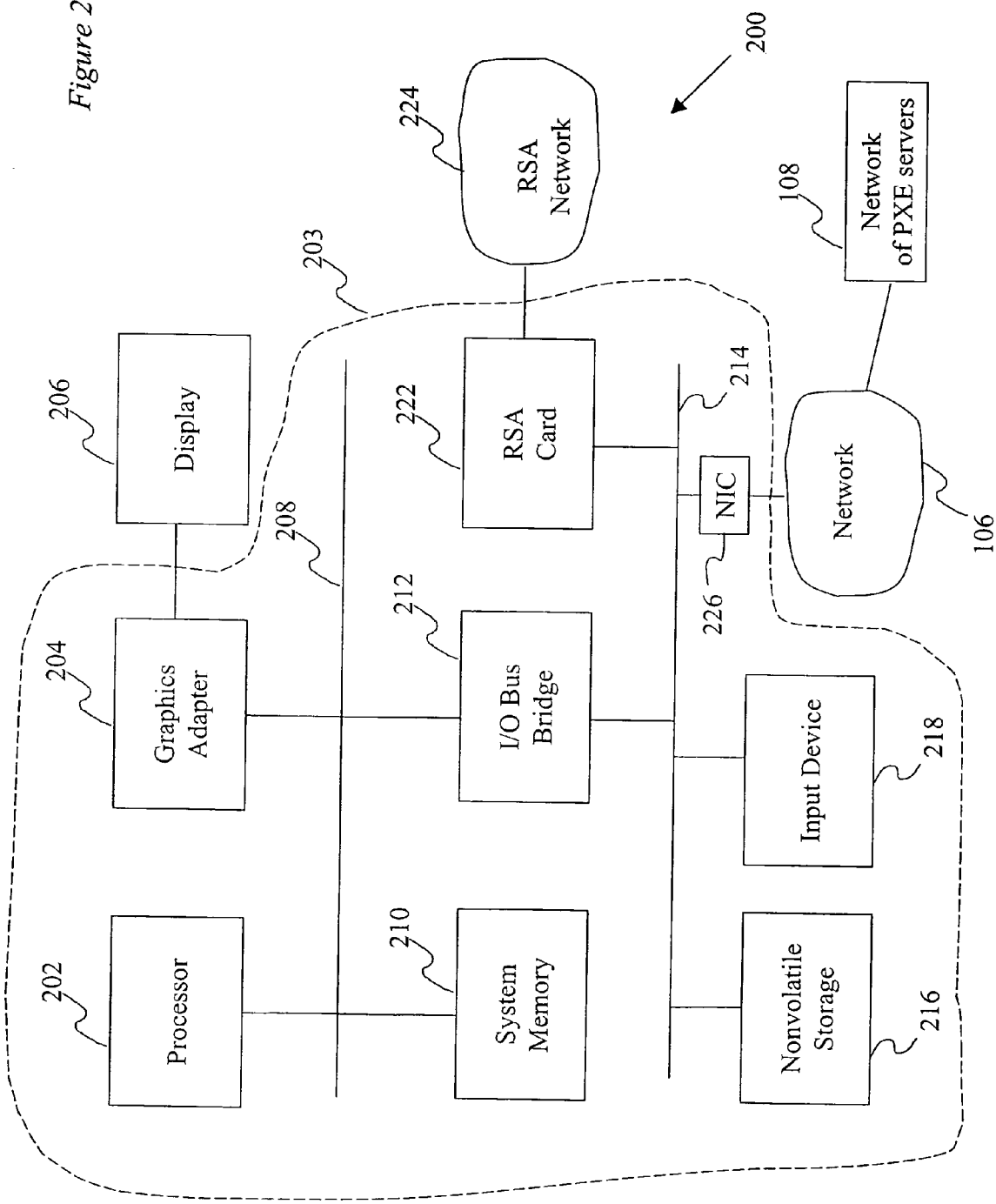
FIG. 2a illustrates a computer system utilizing the present invention.

With reference now to FIG. 2a, there is depicted a block diagram of a data processing system in which a preferred embodiment of the present invention may be implemented. Data processing system 200 includes multiple server blades, including illustrated server blade 203. Each server blade 203 includes a processor 202, which is preferably a plurality of processors (multi-processors) operating in a coordinated manner. Processor 202 is connected to a system bus 208. In the exemplary embodiment, server blade 203 includes a graphics adapter 204, also connected to system bus 208, receiving interface information for display 206.

Also connected to system bus 208 are system memory 210 and input/output (I/O) bus bridge 212. I/O bus bridge 212 couples I/O bus 214 to system bus 208, relaying and/or transforming data transactions from one bus to the other. Peripheral devices such as nonvolatile storage 216, which may be a hard disk drive, floppy drive, a compact disk read-only memory (CD-ROM), a digital video disk (DVD) drive, or the like, and input device 218, which may include a conventional mouse, a trackball, or the like, are connected to I/O bus 214. Server blade 203 communicates to a network 106 via a Pre-boot eXecution Environment (PXE) enabled Network Interface Card (NIC) 226 and to a hyper-secure Remote Supervisor Adapter (RSA) network 224 via an RSA card 222 as shown.

The exemplary embodiment shown in FIG. 2a is provided solely for the purposes of explaining the invention and those skilled in the art will recognize that numerous variations are possible, both in form and function. For instance, data processing system 200 might also include a sound card and audio speakers, and numerous other optional components. All such variations are believed to be within the spirit and scope of the present invention.

Figure 2B:
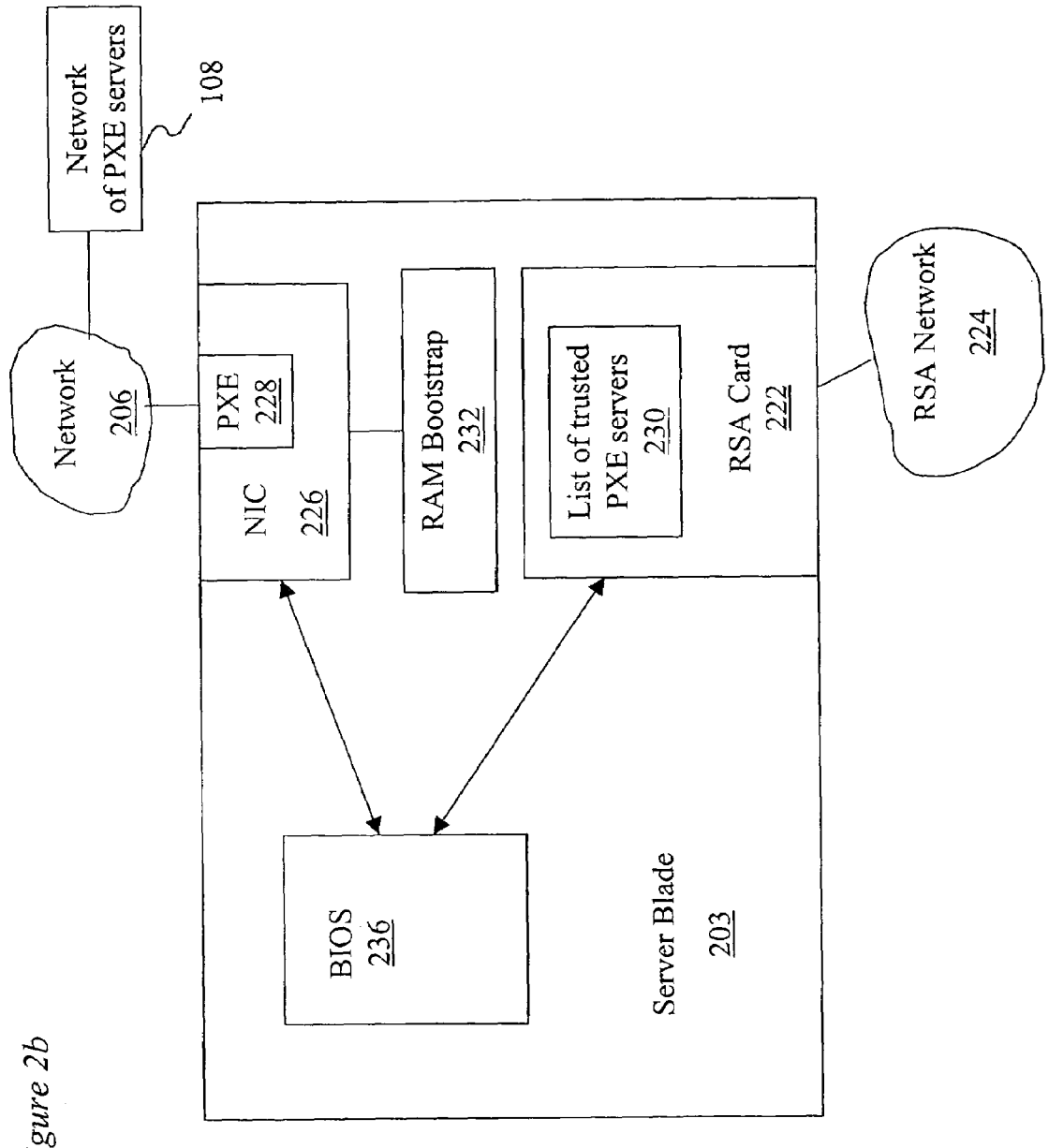

FIG. 2b illustrates details of an interplay between NIC 226 and RSA card 222. NIC 226 includes PXE software 228, which permits NIC 226 to communicate with a PXE server from PXE boot server network 108. In such a configuration, each server blade 203 has a relationship to PXE boot servers similar to that of a client and server, in which the server blade 203 acts as a client to the PXE boot server. Thus, when server blade 203 initially is powered up, RAM bootstrap 232 directs where and how server blade 203 is to boot-up an operating system (from a local drive, local programmable read-only-memory PROM, a network boot, etc.). If the RAM bootstrap 232 instructs server blade 203 to boot from a network boot, then that network boot eventually works with Basic Input/Output System (BIOS) 236 to boot-up an operating system for server blade 203. Before the network boot is accepted, however, BIOS 236 must receive an authorization to accept a specific network boot program according to whether that network boot program came from a PXE server on the list of trusted PXE servers 230, which is stored on RSA card 222 under the control of a remote supervisor on hyper-secure RSA network 224.

Figure 3:
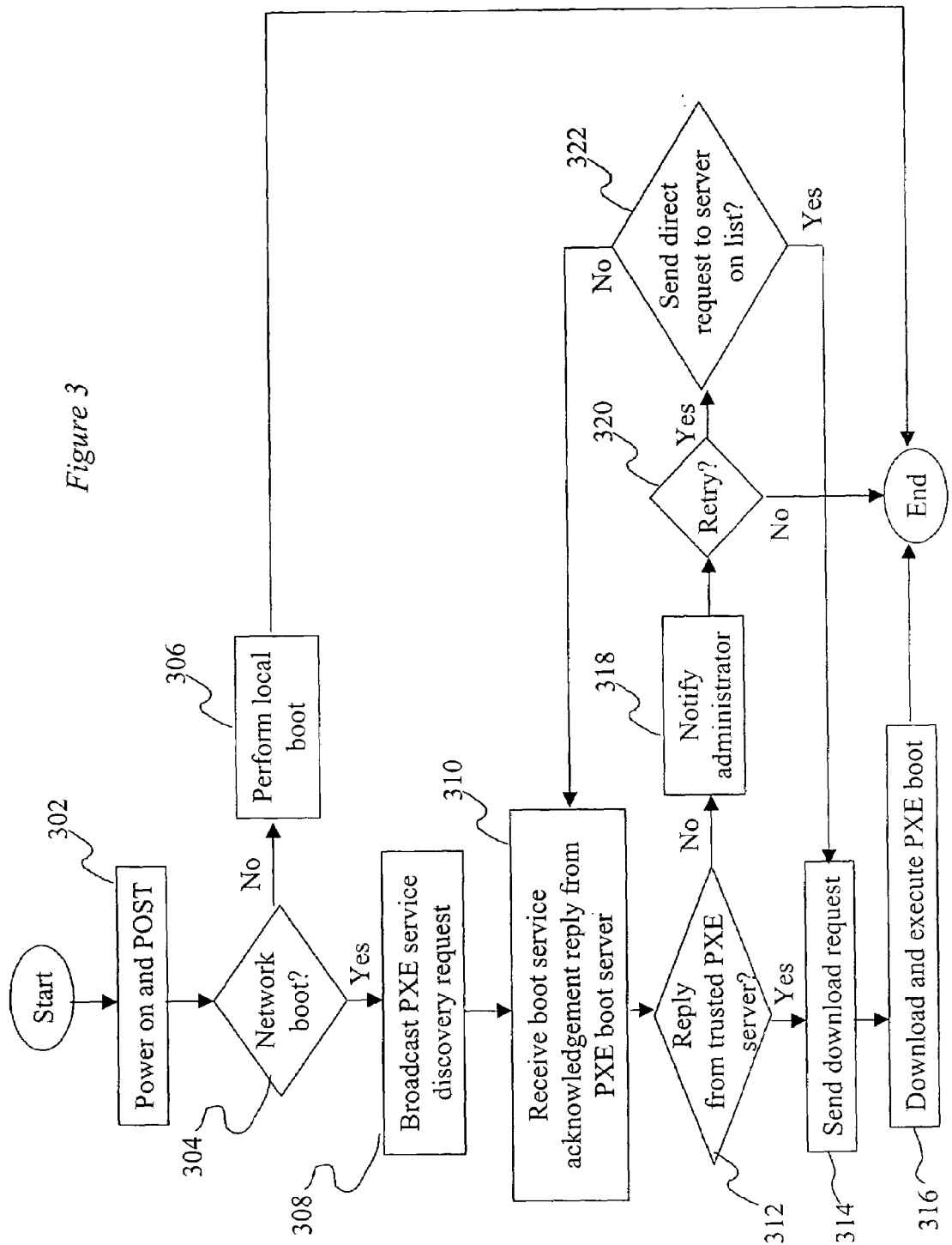
FIG. 3 is a flow-chart of steps taken in a preferred embodiment of the present invention.

With reference now to FIG. 3, there is depicted a flowchart of a preferred embodiment of the present invention's method for securely obtaining a network boot program for a server blade. As shown at block 302, the server blade is powered up and a Power On Self-Test (POST) program is run, performing basic system testing. If a decision is made at query block 304 to perform a local boot (e.g., from a local device such as a hardfile), the server blade performs such a boot (block 306) and the process ends.

However, if the bootstrap program of the server blade instructs the server blade to boot up using a network supplied boot program, then the server blade broadcasts a PXE service discovery request (block 308), asking a network of boot PXE servers to return a boot program appropriate for the server blade. The server blade then receives an acknowledgment reply from at least one PXE boot server (block 310). If the reply comes from a PXE server on the list of trusted PXE boot servers (query block 312), then the server blade sends a request to the PXE server for a download of the boot program offered by the PXE server (block 314), and then downloads and executes the boot program (block 316). In a preferred embodiment, this comparison is made by evaluating the responding boot PXE server's packets at Layer 3 of the Open Systems Interconnection (OSI) model. As known to those skilled in the art, upper OSI layers 7 through 4 support Application, Presentation, Session and Transport respectively, while lower OSI layers 2 and 1 support Data Link and Physical levels respectively. OSI layer 3 is the Network layer, which provides switching and routing criteria, including the establishment and use of Internet Protocol (IP) addresses. In a preferred embodiment of the present invention, the PXE enabled NIC performs Layer 3 packet filtering by comparing the IP address of the responding boot PXE server with those IP addresses listed in the list of trusted PXE servers. This permits Layer 3 filtering of Pre-boot eXecution Environment/Bootstrap Protocol (PXE/BootP) traffic, which is a preferred protocol for transmitted network boot programs in the present invention.

If the received response is from a boot PXE server that is NOT on the list of trusted PXE servers, then a system administrator (not shown) is notified (block 318). Preferably, this message is sent as a Simple Network Management Protocol (SNMP) trap or alert via the RSA network. A query is then made (query block 320) as to whether the server blade wishes to retry a network boot. If so, then there are two options (query block 322): evaluate another boot service acknowledgment reply to the previously broadcast request for a network boot, or else send a new request for a network boot directly to one of the PXE servers on the list of trusted PXE servers. In the majority of cases, multiple boot service acknowledgment replies to the previously broadcast boot program request are received by the server blade, and at least some, if not most of the responses, are from PXE servers on the trusted list. Thus, the usual decision will be to re-evaluate another of the boot service acknowledgment replies. However, if the server blade does not wish to evaluate these additional boot service acknowledgment replies, due to a predetermined criteria such exceeding a number of response evaluations, then a slower request directly to a PXE server on the trusted list is made. This direct request is typically slower and thus less efficient than a broadcast request since the chosen PXE server may be busy or have other operational problems. Alternatively, the direct request may be to a PXE server on a secure local area network (LAN), thus ensuring that the PXE server is authorized.

Figure 4:
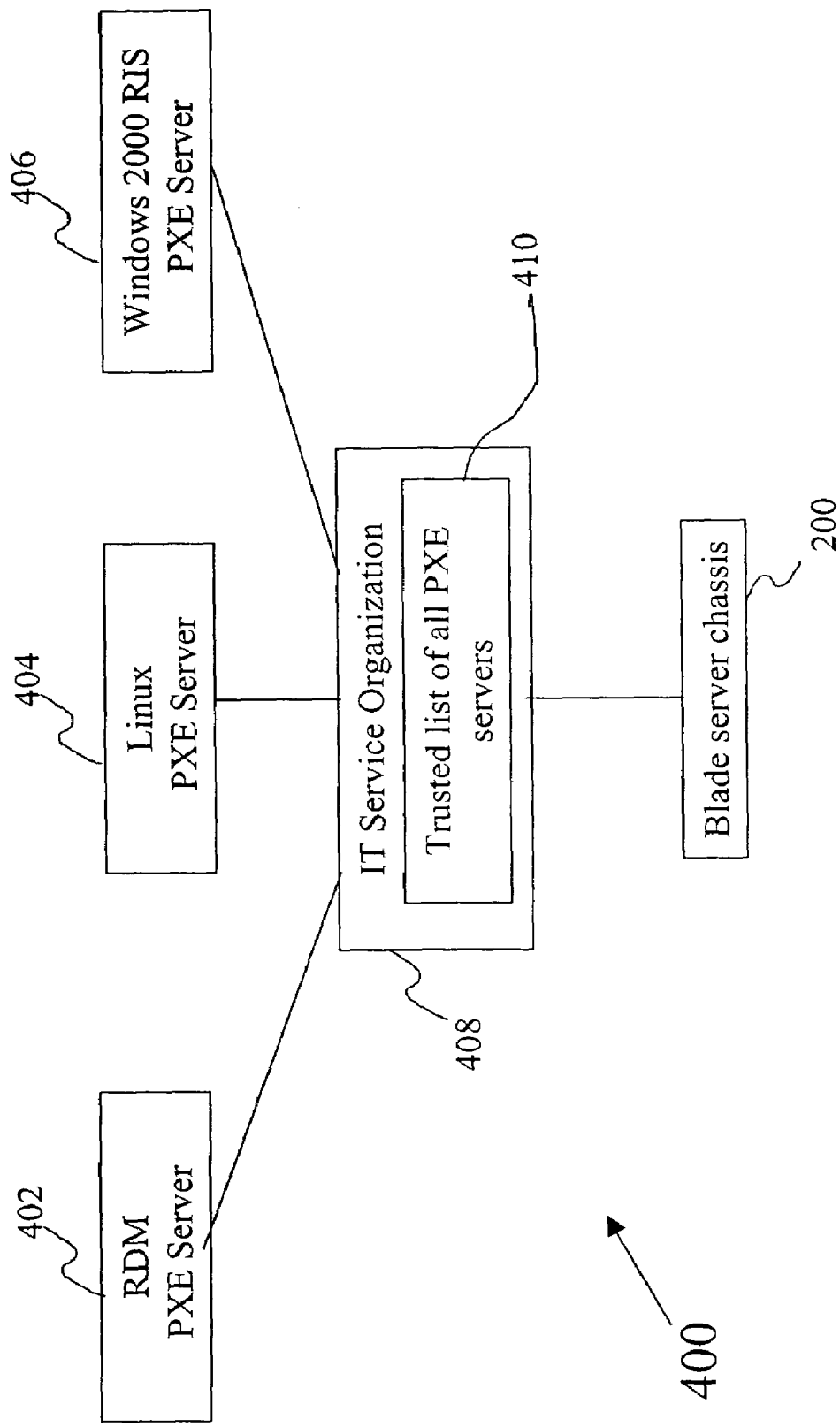
FIG. 4 illustrates a network of multi-type Pre-boot eXecution Environment (PXE) servers.

In another preferred embodiment, an information technology (IT) service organization is used to coordinate alternate types of PXE servers. One limitation of the PXE protocol is that more than one PXE server in a network causes chaos due to the lack of ability in the PXE client to determine what server is the preferred type of server. Referring now to FIG. 4, there is illustrated a block diagram of a PXE network 400 having an Information Technologies (IT) service organization, such as IBM's Global Services (IGS) that manages various deployment server types, such as Remote Deployment Manager (RDM) PXE server 402, Linux® PXE server 404, and Windows® 2000 Remote Installation Services (RIS) PXE server 406 for contracted accounts. The IT service organization 408 assigned systems administrator maintains a list 410 of trusted PXE boot program servers, which allows the same IT service organization 408 assigned systems administrator to manage the various deployment server types, maintain the permission lists for each PXE boot program server type, monitor the network for unauthorized PXE servers, and shut down network ports of the unauthorized PXE servers for server blades in the data processing system 200 in the blade server chassis. Use of the aforementioned embodiments allow the IT service organization 408 to manage various PXE servers and to have them coexist in the same network, and thus reducing supports costs created by the consolidation of network and support organizations, since the permission list for each chassis can control where each blade chassis obtains its boot image.

The present invention thus provides a method and service for securely controlling a network boot of a server blade. This prevents unauthorized boot servers, malicious or simply erroneously on a network, from booting up the server blade, thus resulting in an improperly functioning server blade. While the present invention focuses on server blades, it is understood that any computer utilizing the described invention, particularly those with remote supervisor capabilities, is within the purpose and scope of the present invention.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A service for managing a network boot of a client computer, the service comprising:
    storing a list of trusted Pre-boot eXecution Environment (PXE) boot program servers in an interface service card coupled to a client computer on a network, the interface service card also being coupled to a hyper-secure remote service network that includes remote supervisor computer, wherein the remote supervisor computer controls the storage of the list of trusted PXE boot program servers in the interface service card;
    broadcasting a request for a boot program from the client computer to a network of PXE boot program servers;
    receiving a response to the request for the boot program at the client computer, the response being from a responding boot program server on the network of PXE boot program servers;
    comparing an identity of the responding boot program server with the list of PXE trusted boot program servers; and
    upon verifying that the responding boot program server is on the list of PXE trusted boot program servers, requesting and downloading onto the client computer a boot program from the responding PXE boot program server.

2. The service of claim 1, further comprising:
    in response to determining that the responding boot program server is not on the list of trusted boot program servers, blocking the requesting of the boot program from the responding boot program server.

3. The service of claim 2, further comprising:
    in response to determining that the responding boot program server is not on the list of trusted boot program servers, generating an alert to a designated administrator of a presence of an unauthorized boot program server on the network of boot program servers.

4. The service of claim 1, wherein the comparing step is performed by configuring the client computer to perform Layer 3 packet filtering to identify Pre-boot Execution Environment/Bootstrap Protocol (PXE/BootP) traffic, wherein Layer 3 is a network layer of the seven layers of the Open System Interconnection (OSI) model.

5. The service of claim 1, further comprising:
    in response to determining that the responding boot program server is not on the list of trusted boot program servers, downloading a boot program from a known trusted boot sewer in a secure local area network (LAN).

6. The service of claim 1, wherein the client computer is a server blade.

7. The service of claim 6, further comprising:
    managing different types of boot program servers available to the server blade by maintaining, in an information technology services organization logically oriented between the different types of boot program servers and the server blade, a permission list of boot program servers authorized for each server blade in a server blade chassis.

8. The sex-vice of claim 1, wherein the remote supervisor computer is part of an Information Technology (IT) services organization that manages various types of Pre-boot eXecution Environment (PXE) deployment servers, and wherein the IT services organization enables a same IT service organization assigned systems administrator to manage the various types of PXE deployment servers, to maintain permission lists for each PXE server type, to monitor a network for a presence of unauthorized PXE servers that are not authorized, by the IT services organization, to support the client computer, and to shut down network ports, for unauthorized PXE servers, in the client computer.

* * * * *